R. E. FRIES.
METHOD OF MAKING AXLE HOUSINGS.
APPLICATION FILED NOV. 22, 1916.
1,243,398.
Patented Oct. 16, 1917.
3 SHEETS—SHEET 1.
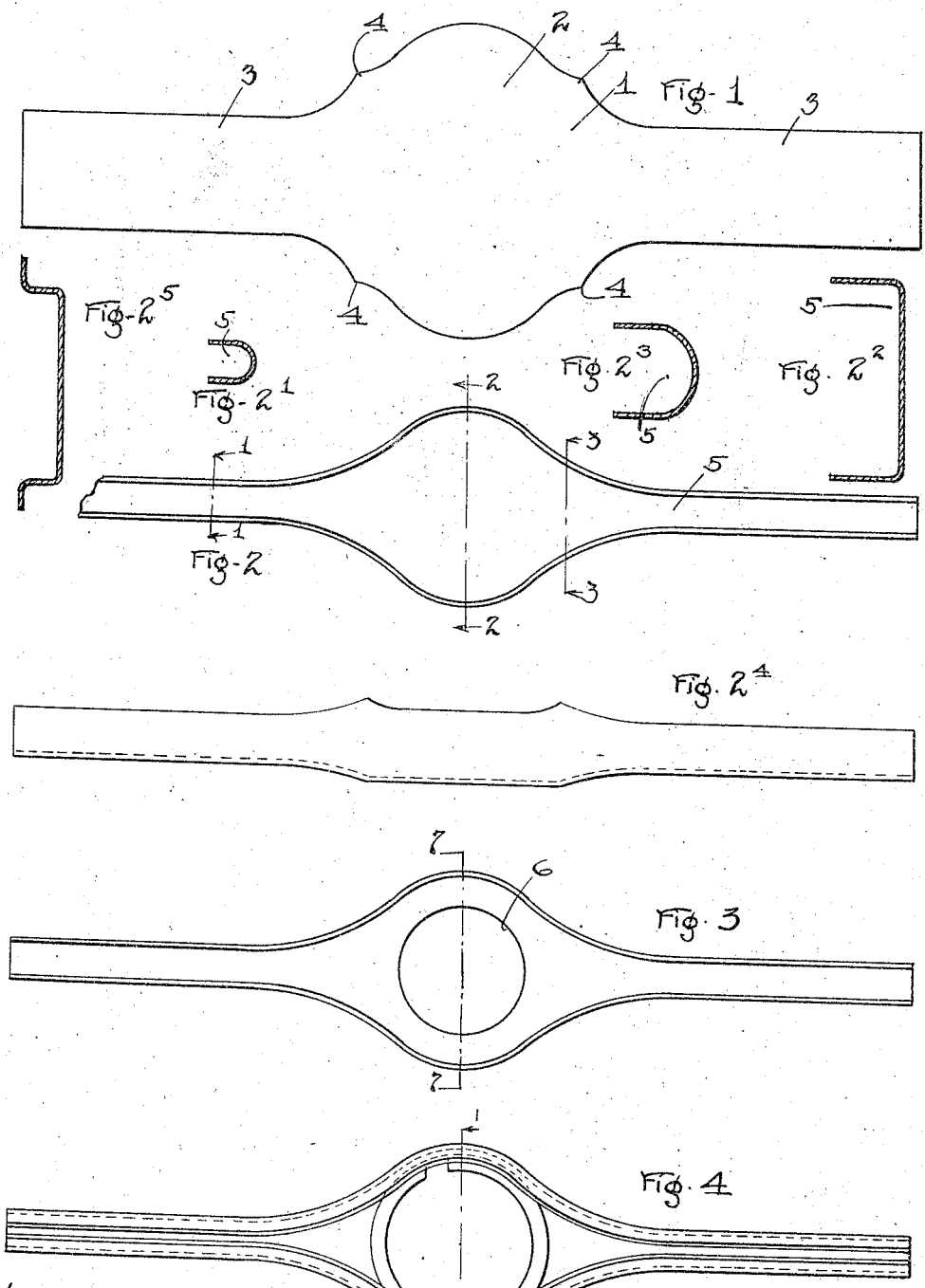
WITNESSES=
O. M. Kappler
Mary Gladwell
INVENTOR
Robert E. Fries.
BY Fay, Oberlin & Fay
ATTORNEYS.

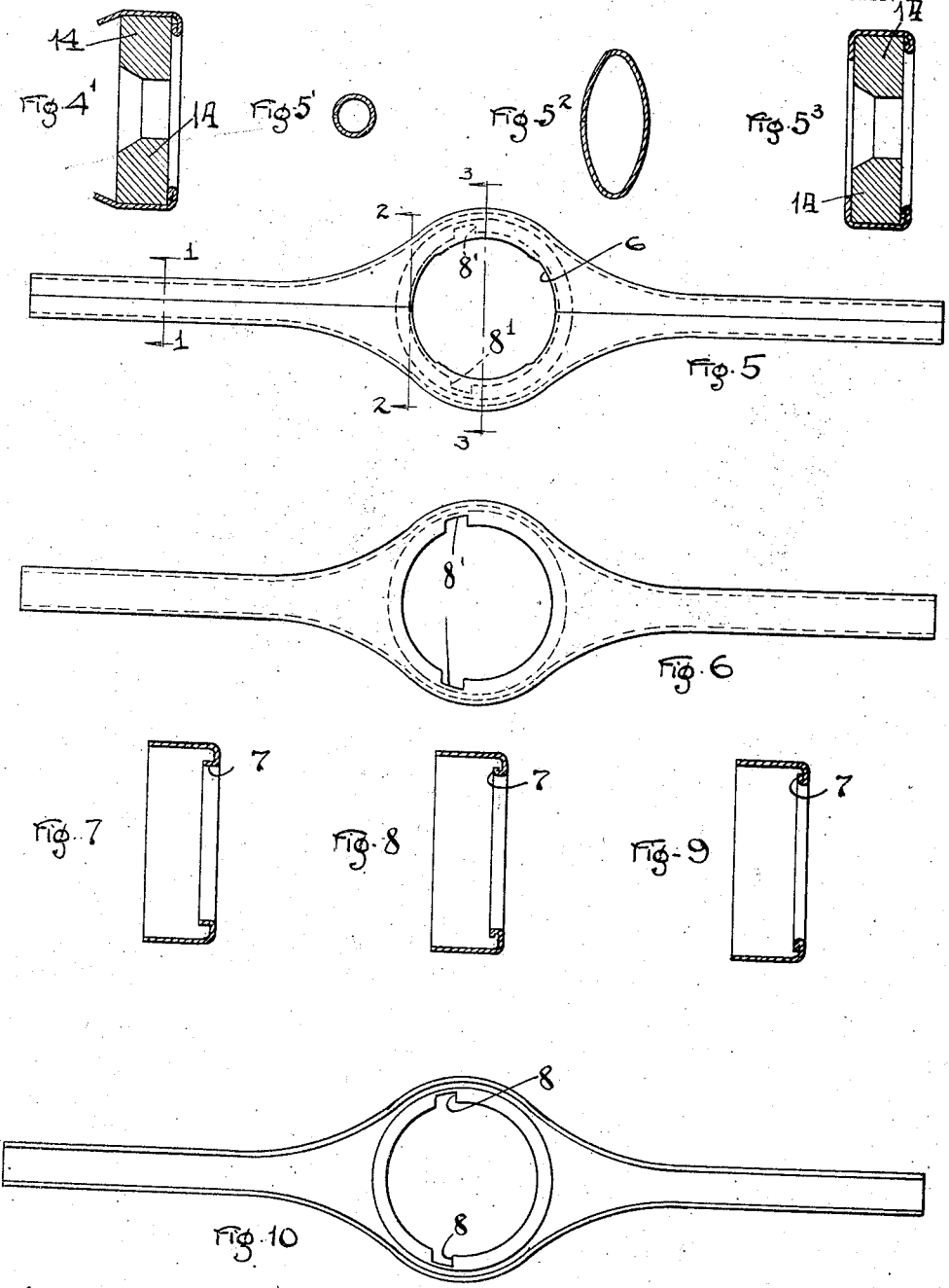

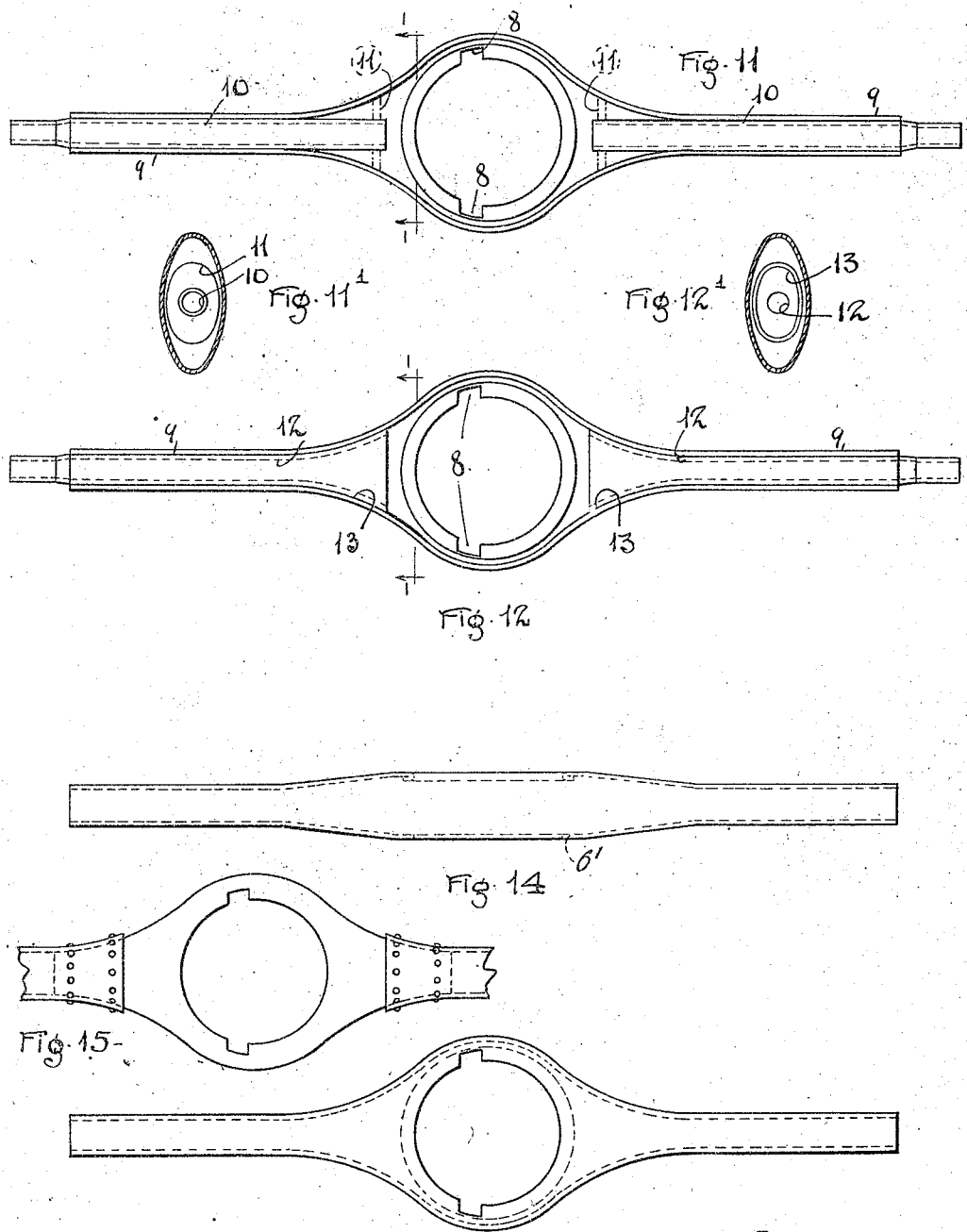

UNITED STATES PATENT OFFICE.

ROBERT E. FRIES, OF CLEVELAND, OHIO, ASSIGNOR TO THE COLUMBIA AXLE COMPANY, OF CLEVELAND, OHIO, A CORPORATION OF OHIO.

METHOD OF MAKING AXLE-HOUSINGS.

1,243,398.     Specification of Letters Patent.     Patented Oct. 16, 1917.

Application filed November 22, 1916. Serial No. 132,793.

*To all whom it may concern:*

Be it known that I, ROBERT E. FRIES, a citizen of the United States, and a resident of Cleveland, county of Cuyahoga, and State of Ohio, have invented a new and useful Improvement in Methods of Making Axle-Housings, of which the following is a specification, the principle of the invention being herein explained and the best mode in which I have contemplated applying that principle, so as to distinguish it from other inventions.

The present invention relates, as indicated, to a method of manufacturing axle housings, and is more particularly concerned with the manufacture out of a single member of a complete rear axle housing and differential casing for a motor vehicle having but a single closed joint or seam along one side of the finished product. At present axle housings are made in a number of different ways, but all methods involve the use of two blanks which must be put together and welded to form the finished axle housings, thus producing two welded seams or joints at opposite points in the axle housing. A welded joint in such a construction is always a source of possible weakness, since the strength of such a joint depends upon the care and skill of the workmen to a large extent, and the potential strength and life of an axle depends, therefore, very much upon the length of the welded seams. The present method of manufacture eliminates much of the welding which must be done on an axle made up of two pieces, thus producing a very much stronger construction, and one that is also very much cheaper.

By the foregoing statement of the object and functions of the present invention I do not mean that no axles are at present constructed out of a single sheet, for axles with open central portions are now in use; but these fall short of constituting a complete and unitary axle housing since the differential mechanism is there inclosed in a separate casing wholy independent of the axle proper, this casing merely being supported within the open center of the axle member. By my new method it is possible to make a complete housing from a single blank in which the entire axle mechanism including the differential is both supported and inclosed.

The annexed drawings and the following description set forth in detail certain means and one mode of carrying out the invention, such disclosed means and mode illustrating, however, but one of the various ways in which the principle of the invention may be used.

In said annexed drawings:—

Figure 1 is a plan view of the formed blank; Fig. 2 is a similar view of the blank after the initial bending or forming operation; Figs. 2', 2² and 2³ are sections on the planes 1—1, 2—2, and 3—3, respectively in Fig. 2, and Fig. 2⁴ is a side view of the member shown in Fig. 2 looking up; Fig. 2⁵ is a section on the line 2—2, Fig. 2 showing the blank where partially formed; Fig. 3 is a side view of the housing or blank after the third, or hole punching operation; Fig. 4 is a side view of the partially formed housing after the initial portion of the closing or final forming operation, this view also showing the notching at one side, although this may be omitted from the method, if desired; Fig. 4' is a section on the line 1—1 in Fig. 4; Fig. 5 is a similar view of the housing at the completion of the folding operation showing the housing formed with the differential gear notches, and Figs. 5', 5² and 5³ are sections on the planes 1—1, 2—2 and 3—3 respectively in Fig. 5; Fig. 6 is a side view of the housing after the welding of the seam; Figs. 7, 8 and 9 are sections on the plane 7—7 in Fig. 3 showing the form of the central portion after the intermediate steps of edging, falsewiring and flattening, respectively; Fig. 10 is a side view of the blank as shown in Fig. 9 after the intermediate step of notching; Fig. 11 is a side view of the blank before the closing operation of Fig. 5 showing the positioning of the reinforcing tubes and baffle plates; Fig. 12 is a similar view showing the use of tubes having conical ends; Figs. 11' and 12' are sections on the planes 1—1 in Figs. 11 and 12 respectively, Fig. 13 is a side view of the closed housing (of Fig. 5) after the second notching and the trimming operation and after the welding (of Fig. 6); and Fig. 14 is a plan view of the finished housing; and Fig. 15 a side elevation of a modified type of housing.

My improved method of manufacture comprises a series of main operations which are utilized in the production of a complete and inclosed axle housing from a single sheet and also of a number of minor or intermediate operations, which, while not essential, contribute to the production of a complete housing although they may either be omitted entirely or carried out in other ways after the formation of the general housing. Thus, the major steps in my method are the punching of the blank, the bending of the same into channel or more specifically U-shape, the punching of the central hole, the closing or final forming operation and the welding. The other steps are ones which are preferably made a part of the complete method, but are ones which may be varied considerably to suit different conditions and to produce particular housings for certain purposes. Such steps are the forming of a double center or inturned flange about the central hole, the notching of the front and back of the central or differential portion of the housing, the placing of the reinforcing tubes of different kinds and the trimming of the rear hole after the final forming. For convenience and clearness I will describe all of the above steps in their preferred order of occurrence.

The first step in my improved method of manufacture consists of the stamping or punching out, preferably from a flat sheet or piece of stock, of a blank 1 of approximately the shape shown in Fig. 1. This blank will be seen to consist of a substantially circular central or intermediate portion 2 and alined oppositely extending arms or strips 3. The annular central portion 2 is formed to produce in the final housing a hollow annular member which will constitute the differential housing of the finished axle when supplied with suitable cover plates as is customary in such constructions, and the alined oppositely extending arms are intended, when formed as will be described hereinafter, to constitute the axle receiving tubes of the finished product. The blank 1 is formed with slight projections 4 which supply sufficient stock to permit of a gradual enlargement or taper from the inner ends of the axle tubes into the central casing or differential housing, and the use of such enlargements or extensions 4 is very desirable in order to produce a central hole on the joint side of the housing.

The second step consists in the bending or forming of the blank shown in Fig. 1 into a channel or approximately U-shaped member 5, as shown in Fig. 2, and in the sections of Figs. 2', 2² and 2³. This change in form, or channeling may be accomplished in any desired manner, although preferably carried out in a large punch press and to the extent indicated by the above mentioned sections. It will be understood that this forming or channeling of the blank may be carried out in one, two, or even more stages if desired. For example: if carried out in two stages, then the blank will be formed as shown in Fig. 2⁵ in the initial stage and then formed into the section of Figs. 2', 2² and 2³ in the second stage.

The third step consists in punching a central hole 6 in the blank as shown in Fig. 3, this hole being disposed preferably substantially centrally within and concentric with the central annular portion of the blank, and being formed, of course, to permit the assembly of the differential mechanism within the finished central portion. At this point the blank will preferably be annealed to insure against damage to the metal during the steps to be described in the following paragraphs and under some conditions it may be desirable to anneal at several points in the process, but this may safely be left to those skilled in this art.

On the front side of the usual axle housing there is carried a heavy front cover plate or differential carrier which coöperates with the housing proper to constitute an inclosing chamber for the differential mechanism, and also usually coöperates with the housing proper to support the bearings in which the driving shaft is mounted. By reason of the weight and function of this front cover plate it is desirable that the same be very securely attached to the housing, and to form a firm support for this cover plate and to afford greater length of threading for the attaching bolts I prefer to produce what may be termed a double center portion around the hole 6 which has been punched in the central portion of the blank. The formation of this inturned flange or double center is preferably carried out in three distinct operations which are shown in Figs. 7, 8 and 9. The first of these operations consists in what is known as "edging" the hole, and by this term is meant the turning up at right angles of a flange 7 as shown in Fig. 7. This flange is then turned or doubled inward upon itself, although it is left spaced from the body portion of the blank as shown in Fig. 8, this operation being termed "false wiring," which is a term common in this art, and which means that the edge is curled inward as it would be if a wire were placed around the flange and the edge of the latter then bent around the wire. The final step in this stage of the formation of the housing is the flattening of this inturned flange or double center 7 and the final form of the hole is shown in Fig. 9, where the inturned flange 7 is parallel and in contact with the inner side of the metal about the hole.

It will be appreciated that since the double center or inturned flange is incorporated in the present construction for a specific purpose, this feature, and the steps required to produce the same, may be omitted whenever desired without in any way affecting the process in its broader aspects and without departing from the spirit of the invention.

It is desirable in motor vehicle rear axles to make the differential portion of the axle housing as small as possible in order to save material and weight and to increase the road clearance. It is necessary, however, that this portion of the housing be large enough to receive the large driving gear which is driven by the pinion on the driving shaft, and in order to mount this gear it is customary to cut opposed notches at suitable points on the upper and lower flanges of the front side of the housing. It will be understood that the use of these notches is in no way essential in such an axle, and is merely an expedient adapted to keep the overall size of the differential portion of the housing within as small limits as possible. In order to provide such notches in the upper and lower flange of the differential portion of the housing. I punch out portions of metal which will leave notches 8 of the desired shape and in the desired position, as indicated in Fig. 10. Obviously this notching operation may be entirely omitted or may be carried out at other stages of the manufacture of the housing, although preferably included for the reasons stated and inserted at the above stage in the method.

It is also usually desirable in such an axle to insert tubes 10 in the extending cylindrical portions for reinforcing these parts (see Figs. 11 and 11'), and it is possible in the present method of manufacture to employ these tubes as arbors or mandrels, about which the arms of the housing are formed, and this will preferably be done. At the inner ends of these tubes are usually disposed baffle plates 11 which support and reinforce the enlarged or tapered portions of the axle arms where they swell into the larger differential portion of the housing, and such baffle plates may be used in the present construction. These baffle plates 11, if so used, will not operate as mandrels, and will not obviate the necessity for using especially constructed dies for the purpose of securing the proper form and taper at this point in the housing, although these dies may be constructed to fit about the ends of the tubes in which position they will serve as arbors to form the arms 3. The baffle plates may be inserted later, and then welded into position in the usual manner. If desired, other tubes 12 with flared or conical ends 13 (see Figs. 12 and 12'), may be used instead of the tubes 10 and baffle plates 11, and in this case the conical ends 13 of the tubes will serve to produce the desired section in the finished housing at this point, and will eliminate the subsequent welding since the fit will be tight enough to prevent the leakage of oil between the tube and axle arm, although it will be desirable to spotweld the tubes to the arms at the inner ends.

The housing at this stage in the manufacture is still in U-shape section, but has been punched, notched, the edge of the front face of the differential portion turned inward upon itself to form a double center, and the reinforcing tubes positioned. The next step consists in the bending or shaping of this U-shape section into a closed member of substantially circular cross-section at its ends, and rectangular cross-section at the central or differential portion. This closing of the U-shape section is preferably carried out in two steps, although the closing may be completed in a single operation if desired. If carried out in two steps, the first will be the starting of the closing or the bending inward of the parallel arms 9 of the U to an extent of about 30 degrees as shown in Fig. 4'. The extent to which these arms are initially bent inward is shown in Figs. 4 and 4', and the initial bend given to the arms is preferably about thirty degrees from their original position. The finish of the closing operation (see Fig. 5), consists in the folding or further bending of the now inclined ends of the U into cylindrical shape, and this involves, of course, the folding around of the central portion of the U which is accomplished preferably by placing sectional forms or dies 14 within the U which will constitute a mold about which the arms of the blank can be formed. It has been stated that the above shaping of the section may be completed in a single step although it is thought safer to carry it out in the successive operations specified since the metal of the blank is less liable to malformation and breakage and the dies are simpler in construction.

In case the hole 6' formed in the joint or rear side of the housing is not of the right dimension (see Fig. 5), it is necessary, or at least desirable, to punch through it to trim the edges to the desired size and at the same time notches 8' can be formed coresponding in position to the notches 8 on the opposite side of the housing. These two steps can be carried out simultaneously, thus producing the housing of Fig. 6.

The joining of the abutting edges of the formed sheet may be accomplished in various ways, the most usual and preferred method being by oxy-acetylene welding although other welding methods may be employed if desired.

It will of course be obvious that most of the foregoing steps in the manufacture of axle housings, according to my improved method, can best be carried out with suitable punches and dies, but since the design and construction of these necessary implements can be accomplished by any one skilled in this art, I have considered it unnecessary to show in detail, or to describe the form of these articles. It is also thought to be unnecessary to show apparatus for using these punches and dies, since all of the punching steps will be carried out in suitable presses which are in common use in the manufacture of axle housings and other articles out of sheet metal.

In Fig. 15 I have shown an axle housing of a type sometimes used in which the central portion is made up separately and then riveted to the tubes which form the arms. It will be clear that such a housing can also be made up by my new method, that is, the central portion can be made up from a single sheet by the steps I have outlined. In this construction, the alined arms on the blank, (which in my previously described forms constitute the axle arms) will be shortened to relatively slight extensions from the main circular portion of the blank.

The product which is secured by the present method is not only considerably stronger than an axle housing made of two separate joined blanks or sections, but it is also very much cheaper to manufacture. Several operations are omitted in the present method which are essential in the other methods of manufacture, and the present axle housing requires less than one half the amount of welding necessary on the usual axle.

It will be seen that my axle housing is complete, being adapted, when fitted with the usual cover plates, to not only support, but also wholly inclose the driving axles and differential mechanism without the use of any additional or separate casing for any part of the operating mechanism.

Other forms may be employed embodying the features of my invention instead of the one explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making axle housings, the steps which consist in forming a blank consisting of an enlarged intermediate portion and alined arms extending oppositely therefrom, channeling such blank, and then folding the channeled arms into axle receiving members and such enlarged central portion into a hollow member constituting, with suitable cover plates, a differential-inclosing housing.

2. In a method of making axle housings, the steps which consist in forming a blank consisting of a circular central portion and alined arms extending oppositely therefrom, channeling such blank, punching through such central portion, and then folding the channeled arms into cylinders and such central portion into a hollow casing member constituting, with suitable cover plates, a differential inclosing housing.

3. In a method of making axle housings, the steps which consist in forming a blank consisting of a circular central portion and alined arms extending oppositely therefrom, channeling such blank, punching a hole concentrically through such central portion, and then folding such channeled arms into cylinders and such central portion into a hollow casing member.

4. In a method of making axle housings, the steps which consist in forming a blank consisting of an enlarged central portion and alined arms extending oppositely therefrom, bending such blank into U-shape, punching through such central portion, and then folding the U-shaped arms into cylinders and such enlarged portion into a hollow casing member, constituting, with suitable cover plates, a differential housing, and then joining the adjacent edges of such cylinders.

5. In a method of making axle housings, the steps which consist in forming a blank consisting of a circular central portion and alined arms extending oppositely therefrom, bending such blank into U-shape, punching through such central portion, and then folding the U-shaped arms into cylinders and such circular portion into a hollow casing member, constituting, with suitable cover plates, a differential-inclosing housing, and then welding the adjacent edges of such cylindrical portion.

6. In a method of making axle housings, the steps which consist in forming a blank consisting of a circular central portion and alined arms extending oppositely therefrom, bending such blank into U-shape, punching substantially centrally through such central portion, and folding the U-shaped arms into approximately cylindrical shape with their edges in abutment and such central portion into a hollow casing member and arranged to constitute, with suitable cover plates, a differential-inclosing housing, and then welding such abutting edges.

7. In a method of making axle housings, the steps which consist in forming a blank consisting of a circular central portion and alined arms extending oppositely therefrom, bending such blank into U-shape, punching centrally through such central portion, doubling inward the edges of the hole thus formed, folding the U-shaped arms into approximately cylindrical shape with their edges in abutment and such circular portion into a hollow casing member and arranged to constitute with suitable cover plates, a differential-inclosing housing, and then welding such abutting edges.

8. In a method of making axle housings, the steps which consist in forming a blank consisting of a circular central portion and alined arms extending oppositely therefrom, bending such blank into U-shape, punching centrally through such central portion, doubling inward the edges of the hole thus formed, notching the doubled in edges of such hole, folding the U-shaped arms into approximately cylindrical shape with their edges in abutment and such circular portion into a hollow casing member and arranged to constitute with suitable cover plates, a differential-inclosing housing, and then welding such abutting edges.

9. In a method of making axle housings, the steps which consist in forming a blank consisting of a circular central portion and alined arms extending oppositely therefrom, bending such blank into U-shape, punching centrally through such central portion, doubling inward the edges of the hole thus formed, mounting reinforcing tubes in the U-shaped arms, folding the U-shaped arms about such tubes and folding and compressing such circular portion into a hollow casing member.

10. In a method of making axle housings, the steps which consist in forming a blank consisting of a circular central portion and alined arms extending oppositely therefrom, bending such blank into U-shape, punching centrally through such central portion, doubling inward the edges of the hole thus formed, mounting reinforcing tubes in the U-shaped arms, folding the U-shaped arms about such tubes until their edges are in abutment, and simultaneously folding and compressing such circular portion into a hollow casing member.

11. In a method of making axle housings, the steps which consist in forming a blank consisting of a circular central portion and alined arms extending oppositely therefrom, bending such blank into U-shape, punching centrally through such central portion, doubling inward the edges of the hole thus formed, mounting reinforcing tubes in the U-shaped arms, folding the U-shaped arms about such tubes until their edges are in abutment, simultaneously folding and compressing such circular portion into a hollow casing member and then welding such abutting edges.

12. In a method of making axle housings, the steps which consist in forming a blank consisting of a circular central portion and alined arms extending oppositely therefrom, bending such blank into U-shape, punching centrally through such central portion, doubling inward the edges of the hole thus formed, mounting reinforcing tubes in the U-shaped arms, folding the U-shaped arms about such tubes until their edges are in abutment, folding and compressing such circular portion into a hollow casing member, notching the edges of the holes in the opposite sides of such hollow casing, and then welding such abutting edges.

13. In a method of making axle housings, the steps which consist in forming a blank consisting of a circular central portion and alined arms extending oppositely therefrom, bending such blank into U-shape, punching centrally through such central portion, doubling inward the edges of the hole thus formed, mounting reinforcing tubes in the U-shaped arms, folding the U-shaped arms about such tubes until their edges are in abutment, simultaneously folding and compressing such circular portion into a hollow casing member, notching the edges of the holes in the opposite sides of such hollow casing, and then welding such abutting edges.

14. In a method of making axle housings, the steps which consist in forming a blank consisting of a circular central portion and alined arms extending oppositely therefrom, bending such blank into U-shape, punching centrally through such central portion, doubling inward the edges of the hole thus formed, notching the doubled in edges of such hole, folding the U-shaped arms into approximately cylindrical shape and folding and compressing such circular portion into a hollow casing, then notching the edges of the opening formed by the folded edges of such circular portion, and then welding the adjacent edges of such cylindrical arms and central hollow casing.

15. In a method of making axle housings, the steps which consist in forming a blank consisting of a circular central portion and alined arms extending oppositely therefrom, bending such blank into U-shape, punching centrally through such central portion, doubling inward the edges of the hole thus formed, notching the doubled in edges of such hole, folding the U-shaped arms into approximately cylindrical shape and folding and compressing such circular portion into a hollow casing, trimming the edges of the opening formed by the folded edges of such annular portion, and then welding the adjacent edges of such cylindrical arms and central hollow casing.

16. In a method of making axle housings, the steps which consist in forming a blank consisting of a circular central portion and alined arms extending oppositely therefrom, bending such blank into U-shape, punching centrally through such central portion, doubling inward the edges of the hole thus formed, notching the doubled in edges of such hole, folding the U-shaped arms into approximately cylindrical shape and folding and compressing such circular portion into a hollow casing, trimming the edges of the opening formed by the folded edges of such circular portion, and simultaneously notching such last named edges to correspond with the notching of the first named hole, and then welding the adjacent edges of such cylindrical arms and central hollow casing.

17. In a method of making axle housings, the steps which consist in forming a blank consisting of a circular central portion and alined arms extending oppositely therefrom, bending such blank into U-shape, punching centrally through such central portion, bending the parallel edges of such U-shaped arms toward each other, and then closing such edges by compressing such arms into cylindrical shape and such circular portion into a hollow casing member arranged to constitute, with suitable cover plates, a differential housing.

18. In a method of making axle housings, the steps which consist in forming a blank consisting of a circular central portion and alined arms extending oppositely therefrom, bending such blank into U-shape, punching substantially centrally through such central portion, bending the parallel edges of such U-shaped arms toward each other, closing such edges by compressing such arms into cylindrical shape and such circular portion into a hollow casing member arranged to constitute, with suitable cover plates, a differential housing, and then welding the adjacent edges of such arms and such circular portion.

19. In a method of making axle housings, the steps which consist in forming a blank consisting of a circular central portion and alined arms extending oppositely therefrom, bending such blank into U-shape, punching substantially centrally through such central portion, bending the parallel edges of such U-shaped arms toward each other through an angle of about 30°, closing such edges by compressing such arms into cylindrical shape and such circular portion into a hollow casing member arranged to constitute, with suitable cover plates, a differential housing, and then welding the adjacent edges of such arms and such circular central portion.

20. In a method of making axle housings, the steps which consist in forming a blank consisting of a circular central portion and alined arms extending oppositely therefrom, bending such blank into U-shape, punching substantially centrally through such central portion, bending the parallel edges of such U-shaped arms toward each other, closing such edges by compressing such arms into cylindrical shape and such circular portion into a hollow casing member arranged to constitute, with suitable cover plates, a differential housing, trimming the hole formed in such central portion, and then welding the adjacent edges of such arms and such circular central portion.

21. In a method of making axle housings, the steps which consist in forming a blank consisting of a circular central portion and alined arms extending oppositely therefrom, bending such blank into U-shape, punching substantially centrally through such central portion, bending the parallel edges of such U-shaped arms toward each other, closing such edges by compressing such arms into cylindrical shape and such circular portion into a hollow casing member arranged to constitute, with suitable cover plates, a differential housing, trimming and notching the edges of the hole formed in such central portion, and then welding the adjacent edges of such arms and such circular portion.

22. In a method of making axle housings, the steps which consist in forming a blank consisting of a circular central portion and alined arms extending oppositely therefrom, bending such blank into U-shape, punching substantially centrally through such central portion, placing cylindrical forming members in such arms, bending the parallel edges of such U-shaped arms toward each other, closing such edges by compressing such arms into cylindrical shape about such forming members and such circular portion into a hollow casing member arranged to constitute, with suitable cover plates, a differential housing, and then welding the adjacent edges of such arms and such circular portion.

23. In a method of making axle housings, the steps which consist in forming a blank consisting of a circular central portion and alined arms extending oppositely therefrom, bending such blank into U-shape, punching substantially centrally through such central portion, placing reinforcing tubes in such arms, bending the parallel edges of such U-shaped arms toward each other, closing such edges by compressing such arms snugly about such tubes and such circular portion into a hollow casing member arranged to constitute with suitable cover plates, a differential housing, and then welding the adjacent edges of such arms and such circular portion.

24. In a method of making axle housings, the steps which consist in forming a blank consisting of a circular central portion and alined arms extending oppositely therefrom, bending such blank into U-shape, punching substantially centrally through such central portion, placing reinforcing tubes having enlarged flared inner ends in such arms, bending the parallel edges of such U-shaped arms toward each other, closing such circular portion into a hollow casing member arranged to constitute, with suitable cover plates, a differential housing, and then welding the adjacent edges of such arms and such circular portion.

Signed by me, this 21st day of November, 1916.

ROBERT E. FRIES.